United States Patent

Plantan et al.

[11] Patent Number: 5,992,297
[45] Date of Patent: Nov. 30, 1999

[54] EASY FIT DIAPHRAGM

[75] Inventors: Ronald S. Plantan; Michael M. Holm, both of Charlotte, N.C.

[73] Assignee: Indian Head Industries, Inc., Charlotte, N.C.

[21] Appl. No.: 09/087,523

[22] Filed: May 29, 1998

[51] Int. Cl.$^6$ .................................................... F01B 19/00
[52] U.S. Cl. ............................................................ 92/98 R
[58] Field of Search ..................................... 92/98 R, 128

[56] References Cited

U.S. PATENT DOCUMENTS 4,960,036  10/1990  Gummer et al. .

*Primary Examiner*—John E. Ryznic
*Attorney, Agent, or Firm*—Howard & Howard

[57] ABSTRACT

The present invention provides a brake actuator assembly including a housing having a generally radial annular flange portion and a cover having a generally radial annular flange portion generally co-axially aligned with the generally radial annular flange portion of the housing. A cup-shaped flexible diaphragm having an outer radial annular rim portion is disposed between the generally radial annular flange portions of the housing and the cover. A retaining element generally surrounds and compresses the generally radial annular flange portions of the housing and the cover against the rim portion of the flexible diaphragm. The rim portion of the diaphragm includes a wedge-shaped edge portion and co-axially aligned flats on opposite sides of the rim portion adjacent to the wedge-shaped edge portion aligning the flange portions of the housing and the cover. In another embodiment, a flexible brake diaphragm includes a cup-shaped flexible diaphragm having an outer radial annular rim portion. The rim portion of the diaphragm includes a wedge-shaped edge portion and co-axially aligned flats on opposite sides of the rim portion adjacent to the wedge-shaped edge portion.

15 Claims, 4 Drawing Sheets

EASY FIT DIAPHRAGM

The present invention relates generally to braking systems and, more specifically, to fluid-operated brake actuators such as air brake actuators.

BACKGROUND OF THE INVENTION

Fluid-operated braking systems such as air brake systems have long been used to control the movement of motor vehicles in a safe and effective manner. In particular, air brakes are commonly used on commercial vehicles, such as trucks which typically have large gross vehicle weights. The considerable inertial mass of these heavy-duty vehicles in combination with the high speeds at which they travel require a braking system which responds rapidly with substantial braking power. One system component which is instrumental in the operation of air brake systems is the brake actuator. The brake actuator provides the force necessary when braking a vehicle. Commercial air brake actuators can actuate the normal surface brakes as well as parking/emergency brakes. The brake actuators, also known as spring brakes, typically have a network of air chambers defined by one or more diaphragms and/or pistons and a plurality of springs which operate to provide the appropriate braking action in response to inputs by the vehicle driver. In the event an air braking system loses pressure, the brake actuator automatically engages the vehicle brakes.

In brake actuators of this type, the diaphragms are typically flexible, cup-shaped and have an outer radial rim which is received and compressed between flange portions of a housing and cover. Such diaphragms are generally formed of a rubber material with a fibrous reinforcement disposed therein. Diaphragms are often molded in an ovoid shape making it somewhat difficult to align and assemble the diaphragm in the brake actuator housing. The difficulties in assembly can often lead to leakage of the seal established between the diaphragm and the flange portions of the housing and cover. Great care is taken in the manufacture of the brake actuators in order to test for leaking actuator assemblies, identify leaking brake actuators assemblies, and to eliminate leaking brake actuator assemblies. If the brake actuator assembly leaks, the brake actuator may fail.

In this type of brake actuator assembly, it is important during assembly that the rim portion of the flexible diaphragm be properly seated and aligned prior to being compressed between the opposed radial flanges of the housing and the cover. During assembly the flexible diaphragm must be coaxially aligned with the radial flanges of the opposed housing members. However, due to the ovoid shape of typical diaphragms as received from the manufacturer and curvature of the surfaces of the opposed radial flanges, alignment of the diaphragm and housing is difficult, thereby increasing the potential for leakage.

Additionally, the thickness of radial rim portion of the diaphragm causes difficulty in the assembly of the brake actuator. The thickness of the rim portion of the diaphragm requires that the housing and cover be placed in compression against the diaphragm during assembly in order to facilitate the application of a band clamp which holds the housing and cover in sealing engagement with the diaphragm.

Accordingly, it would be both advantageous and desirable to have a diaphragm which can more easily be positioned and seated during assembly of the brake actuator to reduce the amount of leaking brake actuator assemblies and which also aids in the assembly process by eliminating the step of compressing together the housing and the cover in order to attach and fasten the band clamp.

SUMMARY OF THE INVENTION

In accordance with the present invention, a brake actuator assembly is provided which includes a housing having an open end and a generally radial annular flange portion surrounding the open end, a cover having a generally radial annular flange portion generally coaxially aligned with the generally radial annular flange portion of the housing, a cup-shaped flexible diaphragm having an outer radial annular rim portion located between the generally radial annular flange portions of the housing and the cover, and an annular clamp which may be separate or integral with one of the housing members generally surrounding and compressing the generally radial annular flange portions of the housing and cover against the rim portion of the flexible diaphragm. The rim portion of the diaphragm includes a wedge-shaped edge portion and co-axially aligned flats on opposite sides of the rim portion adjacent the wedge-shaped edge portion which aligns the flange portions of the housing and the cover.

Also in accordance with the present invention, there is disclosed a flexible brake diaphragm which includes a cup-shaped flexible diaphragm having an outer radial annular rim portion. The outer annular rim portion of the diaphragm includes a wedge-shaped edge portion and co-axially aligned flats on opposite sides of the rim portion adjacent to the wedge-shaped edge portion.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a top view of the brake actuator shown in FIG. 1 illustrating a clamp band having two retaining bolts;

DESCRIPTION OF THE PREFERRED EMBODIMENT

Figure 1:
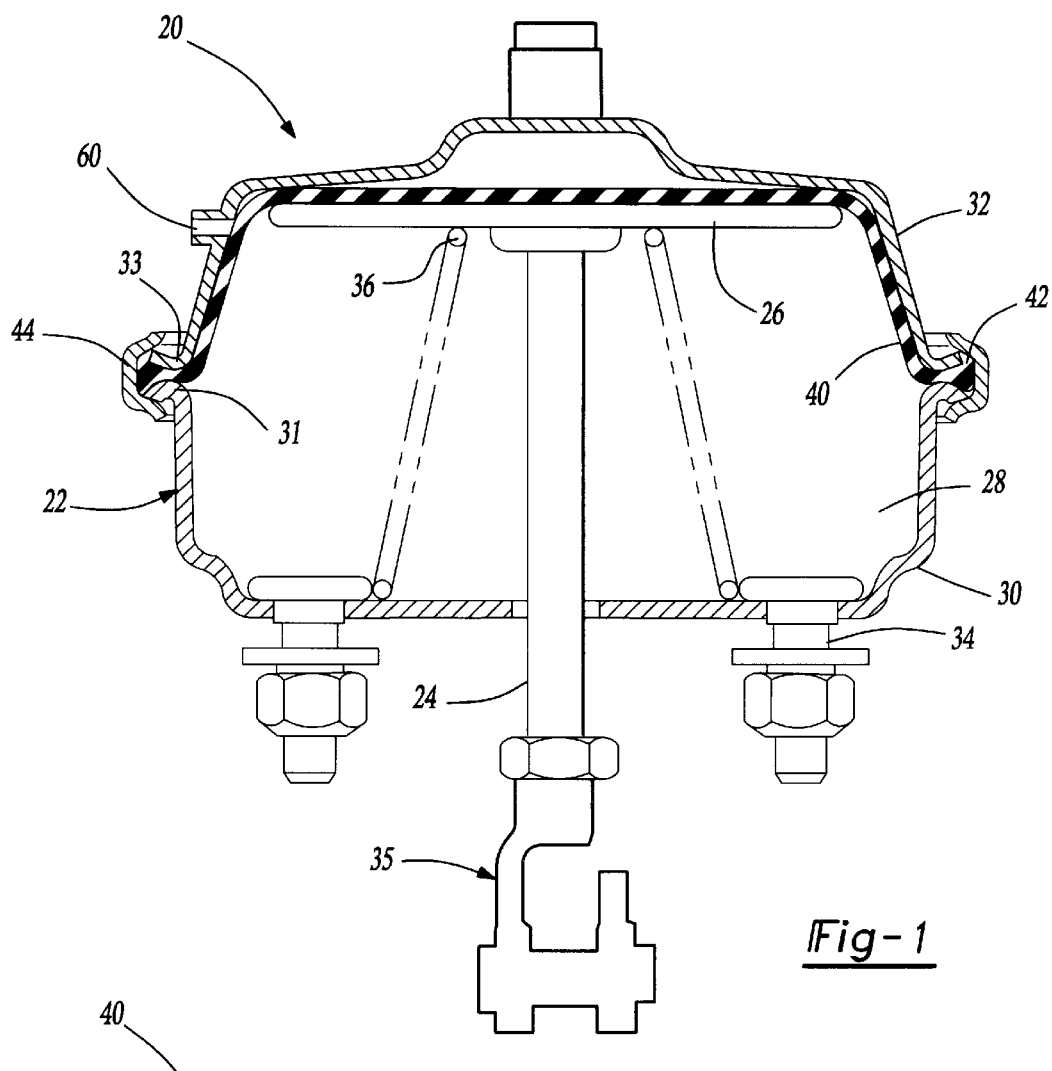
FIG. 1 is a cross-sectional side elevational view of one embodiment of the brake actuator of the present invention.

Referring to FIG. 1 of the drawings, in one embodiment of the present invention, a brake actuator 20 is shown generally, illustrated here as a single-diaphragm air brake actuator. The brake actuator 20 includes a service chamber assembly 22 having a push rod 24 attached to a service side piston 26. The service chamber assembly 22 includes a service housing 30 and a service housing cover 32 which define a non-pressure chamber 28 which encloses a return spring 36. Conventional mounting bolts 34 and a yoke assembly 35 are also shown. Other brake actuator assemblies may be suitable in the present invention.

As will be understood by those skilled in the art, fluid actuated or "air brakes" of this nature are controlled by the movement of one or more flexible diaphragms and rigid piston plates which combine to form a movable wall when actuated by air pressure differentials created in the various chambers of the brake actuator 20.

The brake actuator 20 is equipped with a flexible, cup-shaped, and generally circular diaphragm 40 having a peripheral annular flange 41 including an expanded outside diameter portion or simply expanded portion 42 in the nature of an integral O-ring or the like. The diaphragm 40 forms a hermetic or air-tight seal by the compression of the expanded portion 42 at the interface of the service housing 30 and the service housing cover 32. The diaphragm 40 is formed of a resilient material such as rubber, neoprene, fabric-center reinforced neoprene or the like. In order to obtain this compression of the expanded portion 42 and to attached the service housing 30 to the service housing cover 32, a clamp ring 44 is positioned over an annular flange portion 31 of the service housing 30 and an annular flange portion of the service housing cover 32.

Referring to FIG. 2, the clamp ring 44 is shown in greater detail having two semi-circular portions 50 and 52. Each semi-circular portion 50,52 having tabs or ears 54 through which clamp retaining bolts 56 are inserted to tighten the clamp ring 44 in position by tightening retaining nuts 58 on the clamp retaining bolts 56. That is, the clamp ring 44 secures the service housing 30 to the service housing cover 32 and compresses the expanded portion 42 of the diaphragm 40 forming an air-tight seal. A one-piece, single-bolt clamp of this type is also well known in the art and can be utilized with the present invention.

Referring again to FIG. 1, in the normal service brake mode, air is injected under pressure through an inlet 60 causing the diaphragm 40 and service side piston 26 to move downwardly. It will be understood that the diaphragm 40 and the service side piston 26 form a second movable wall which is air-pressure responsive. The downward movement of this second movable wall causes the push rod 26 to thrust out from the service housing 30 to set the vehicle brakes.

Figure 3:
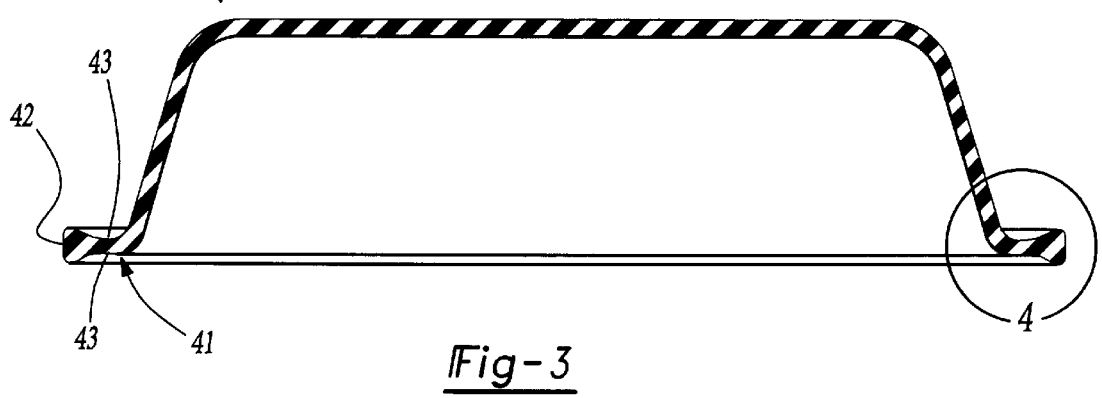
FIG. 3 is a cross-sectional side elevational view of a preferred embodiment of the diaphragm of the present invention.

Referring to FIG. 3, the diaphragm 40 is shown in greater detail. The diaphragm 40 is generally cup-shaped and includes an annular radial flange 41 having an expanded portion 42 and co-axially disposed flats 43 located adjacent to the expanded wedge-shaped portion 42.

Figure 4:
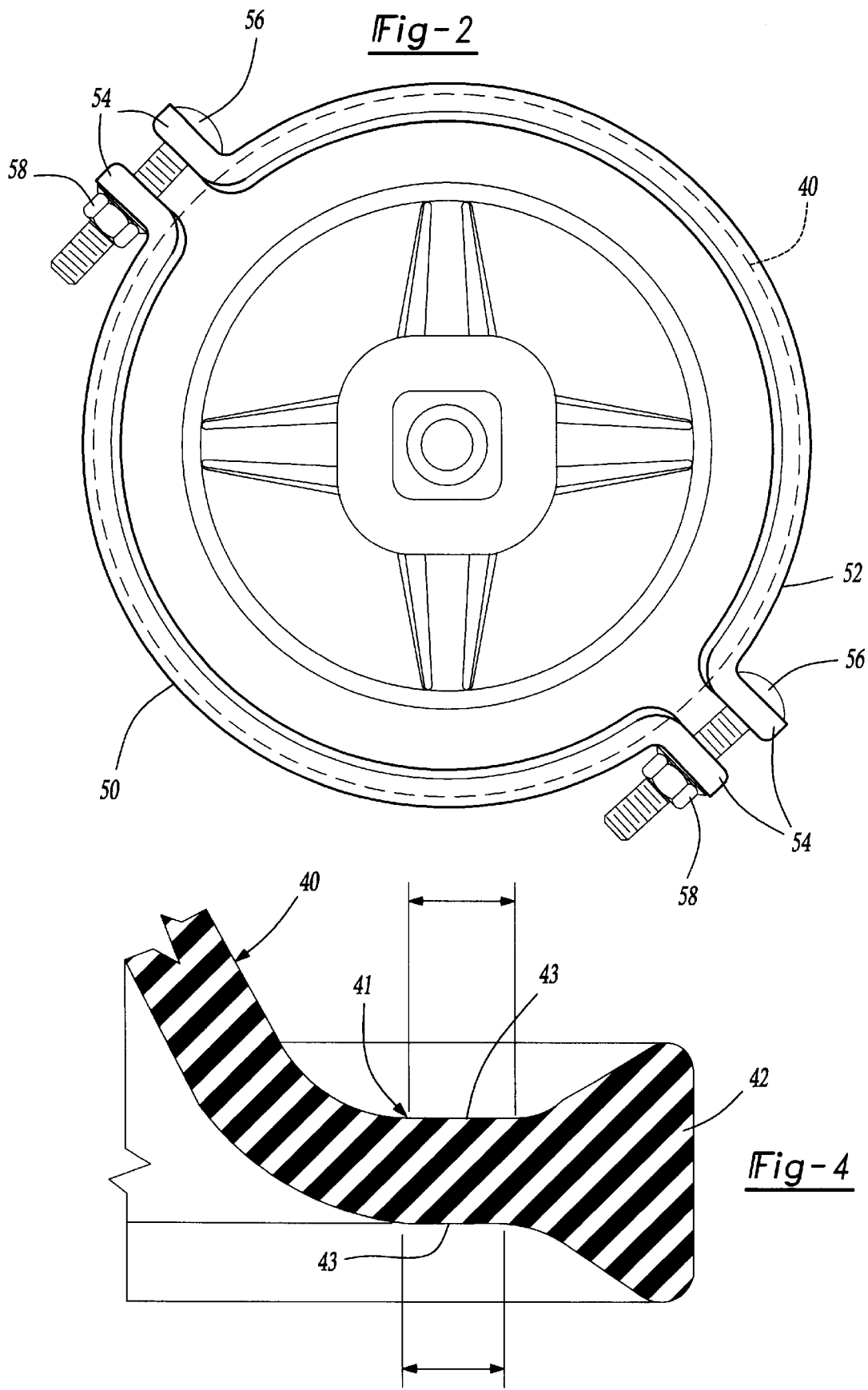
FIG. 4 is an enlarged view of the rim portion of the diaphragm as shown in FIG. 3.

Referring to FIG. 4, the annular flange 41 of the diaphragm 40 is shown in greater detail. The expanded portion 42 of the annular flange 41 is generally wedge-shaped at its outer portion. Adjacent to the wedge-shaped expanded portion 42 of the annular flange 41 are disposed co-axially aligned flat portions 43 on opposite sides of the annular flange 41. The flats 43 preferably have a minimum flat radius or width of approximately 0.030 inches but may be as large as necessary depending upon the dimensions of the diaphragm. Preferably, the width of the flat 43 ranges from approximately 0.030 inches to approximately 0.075 inches. The flats 43 allow the diaphragm 40 to be more easily and accurately seated between the radial flanges 31 and 33.

Figure 5:
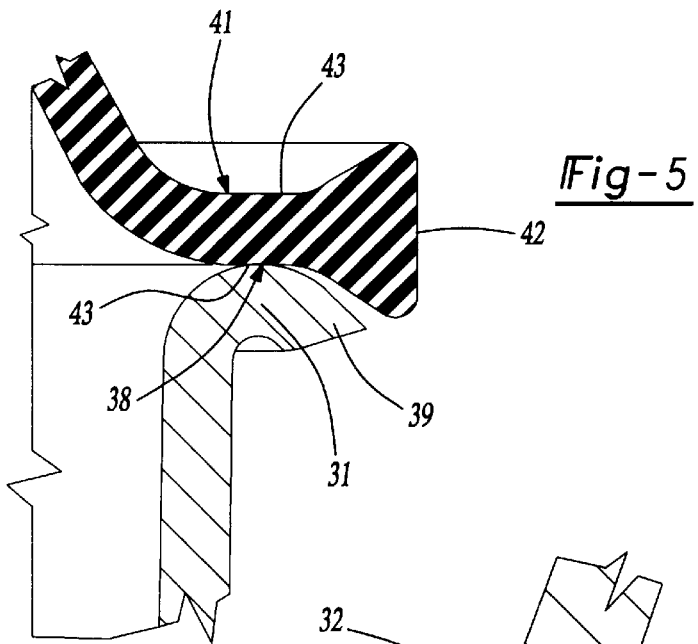
FIG. 5 is a cross-sectional view of the rim portion of the diaphragm resting on a flange portion of the service housing.

Referring to FIG. 5, the annular flange 41 of the diaphragm 40 is shown seated on the radial flange 31 of the service housing 30. Preferably, the opposed flanges 31,33 of the service housing 30 and the service housing cover 32, respectively, are U-shaped in cross-section opening outwardly. The opposed flanges 31 and 33 include a flange engagement portion 38 which engages the flat portions 43 on the annular flange 41. In other words, the U-shaped flange portions 31 and 33 engage the flats 43 of the annular flange 41 at the apogees of the U-shaped region. The portion of the U-shaped flanges 31 and 33 which is aligned with the flats 43 of the annular flange 41 is also referred to as the "locus." Each radial flange 31 and 33 also includes an outer leg 39 which receives and compresses the wedge-shaped expanded portion 42 of the diaphragm 40 during applications of the clamp ring 44.

Figure 6:
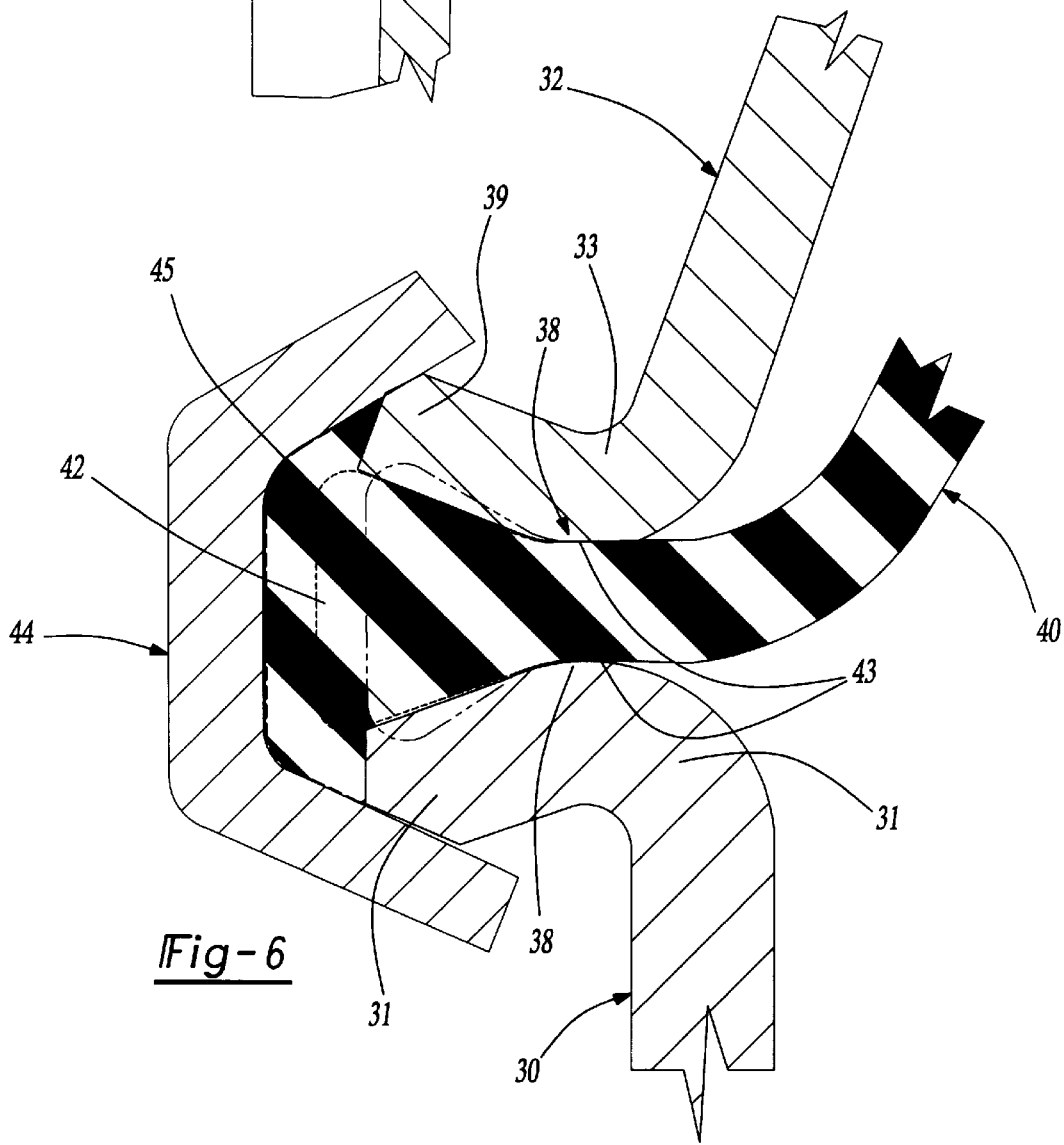
FIG. 6 is a cross-sectional side elevational view of the rim portion of the diaphragm disposed within the service chamber assembly including a clamp ring.

Referring to FIG. 6, the diaphragm 40 is shown disposed between the annular flanges 31 and 33 including the clamp ring 44 disposed thereon. The flats 43 of the annular flange 41 are disposed directly adjacent to the flange engagement portion 38 or apogees of the flanges 31 and 33. As force is applied to the annular flanges 31 and 33 by the clamp ring 44, the wedge-shaped expanded portion 42 of the annular flange 41 is received and compressed by the outer legs 39 of the radial flanges 31 and 33 to fill a generally U-shaped space 45 between the clamp band 44 and the housing members 30 and 32 as shown in FIG. 6. The wedge-shaped expanded portion 42 is compressed to such a degree that it completely fills the space 45 between the clamp band 44 and the housing members 30 and 32 to form a "hydraulic lock." The hydraulic lock reduces the incidence of brake actuator 20 leakage and also reduces creep or "run-out" of the diaphragm 40 which is a particular problem when the diaphragm 40 is not accurately aligned during assembly.

The flexible diaphragm 40 of this invention will thus naturally and accurately seat the flat 43 on the apogee of the U-shaped flange 31 of the service housing 30, even when the diaphragm 40 is initially ovoid when received from the molder. Therefore, the person assembling the diaphragm 40 on the service housing 30 does not have to adjust the location of the diaphragm 40 on the service housing 30 or hold the diaphragm 40 in place during assembly of the cover 32. Similarly, the U-shaped flange 33 of the cover 32 will naturally nest and accurately seat on the opposed flat 43 on the diaphragm rim portion 41 prior to receipt of the clamp ring 44, resulting in a very accurate alignment of the service housing 30, diaphragm 40, and cover 32 which is very important to avoid leakage around the diaphragm 40 following assembly. Finally, the accuracy of the alignment is not likely to be disturbed or displaced during clamping of the flanges 31,33 because the components are nested and are therefore not easily displaced. Because the clamping force is applied on the flats 43, if the diaphragm 40 is not properly aligned on the service housing 30 during assembly, the wedge-shaped portion 42 of the outer flange 41 can be engaged by the U-shaped flanges 31 and 33 to align the diaphragm 40. If the diaphragm 40 is not completely aligned, more of the wedge-shaped portion 42 will be squeezed out at that point creating an adequate seal and essentially self-align the diaphragm 40 between the U-shaped flanges 31 and 33.

Another feature of the diaphragm 40 of the present invention is that by reducing the thickness of the annular flange portion 41 at the flats 43, the clamp band 44 is more easily assembled on the housing 30 and housing cover 32 without the necessity for compressing together the housing 30, diaphragm 40, and housing cover 32 prior to applying the clamp band 44. However, it should be understood, that the clamp band 44 will compress the annular flange portion 41 of the diaphragm 40 as the clamp retaining bolts 56 of the clamp band 44 are tightened.

Figure 7:
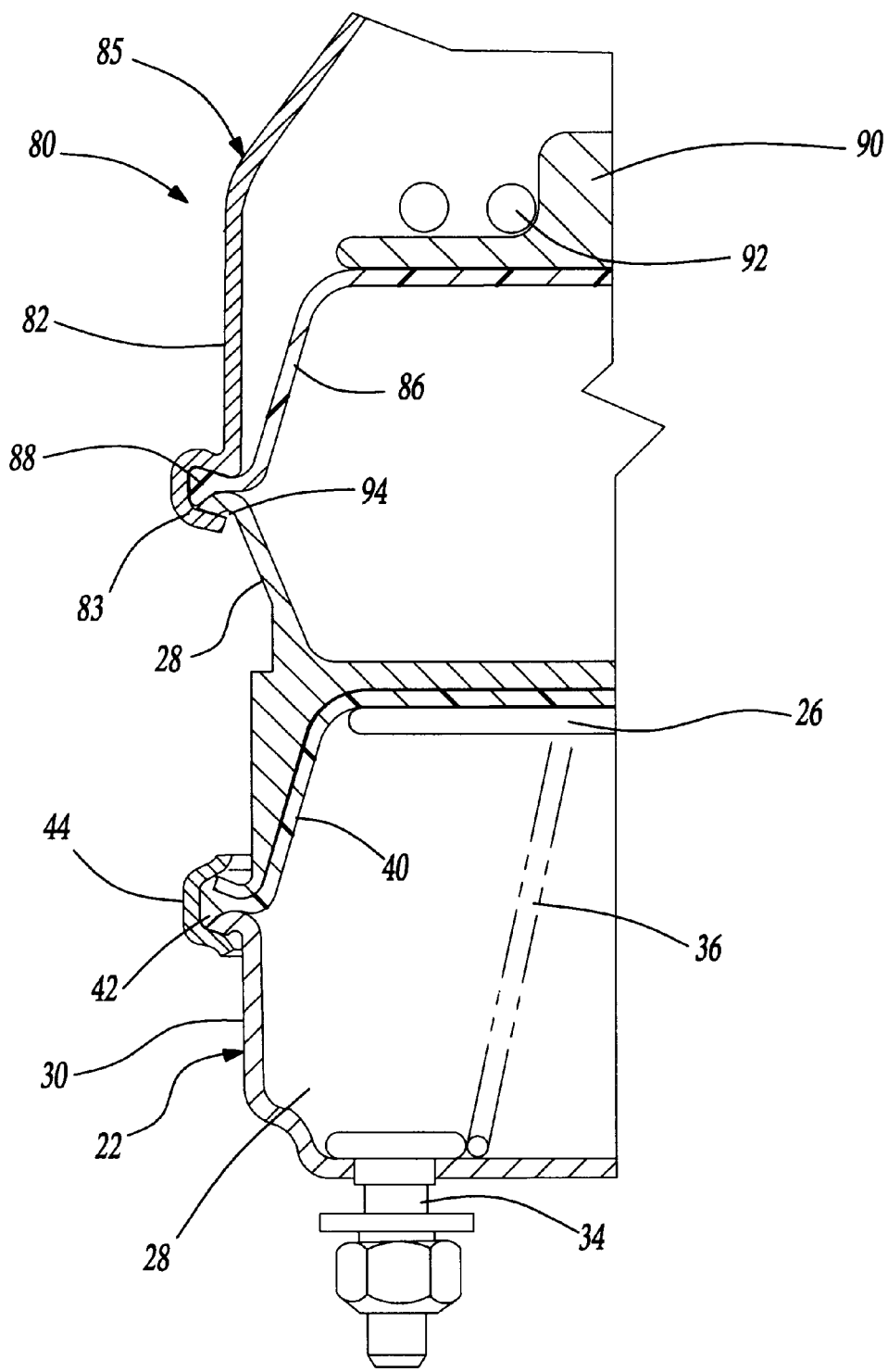
FIG. 7 is a partial cross-sectional side elevational view of an alternative embodiment of the brake actuator of the present invention.

In an alternative embodiment of the present invention and referring now to FIG. 7 of the drawings, a double diaphragm brake actuator assembly 80 is shown generally. Like elements are designated using the same reference numerals as in the embodiment shown in FIGS. 1 through 6. Also, it is to be understood that while the present invention is described in connection with a specific type of brake actuator and has been illustrated with reference to both a single diaphragm brake actuator and a double diaphragm brake actuator, other fluid brake actuators may be made in accordance with the present invention such as piston type brake actuators, without regard to the type of brakes, cam, disc, or wedge, actuated by the brake actuator and with or without external tube breather systems. The present invention is adaptable to virtually any brake actuator wherein a diaphragm is compressed between a first housing and housing cover or a service housing and a flange case or the like and all of these devices are intended to come within the scope of the present invention.

The double diaphragm air brake actuator 80 includes a service chamber assembly 22 and a spring chamber assembly 82. The spring chamber assembly 82 includes a spring side diaphragm 86 having an expanded portion 88 which is in the nature of an integral O-ring or the like. A spring side piston 90 and a power spring 92 are disposed within the spring chamber assembly 82. An annular retaining member 83 disposed on the spring chamber assembly 82 provides a tamper-resistant closure or attachment of the head 85 of the spring chamber assembly 82 to the flange case 84. The retaining member 83 in this embodiment is in the nature of a circular channel clamp which receives flange 94 thereby causing the compression of the expanded portion 88 of the diaphragm 86.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A flexible brake diaphragm comprising a cup-shaped flexible diaphragm having a central portion and an outer radial annular rim portion surrounding a central longitudinal axis, said rim portion of said diaphragm including a wedge-shaped edge portion having outwardly diverging surfaces and parallel radius flats having a width of at least 0.030 inches on opposite sides of said rim portion adjacent said diverging surfaces of said wedge-shaped edge portion, said parallel radial flats extending perpendicular to said longitudinal axis of said diaphragm in its free state.

2. A flexible brake diaphragm as set forth in claim 1, wherein said flats each have a length of at least 0.030 inches.

3. A flexible brake diaphragm as set forth in claim 1, wherein said flats each have a length ranging from approximately 0.030 inches to approximately 0.075 inches.

4. A brake actuator including a housing having an open end and a generally radial annular flange portion surrounding said open end, a cover having a generally radial annular flange portion generally coaxially aligned with said generally radial annular flange portion of said housing, a cup-shaped flexible diaphragm having central longitudinal axis and an outer radial annular rim portion surrounding said central longitudinal axis located between said generally radial annular flange portions of said housing surround cover, and a retainer element generally surrounding and compressing said generally radial annular flange portions of said housing and said cover against said rim portion of said flexible diaphragm, said rim portion of said diaphragm including a wedge-shaped edge portion and parallel radial flats on opposite sides of said rim portion adjacent said wedge-shaped edge portion extending perpendicular to said central longitudinal axis of cup-shaped diaphragm in its free state, said flats aligning said flange portions of said housing and said cover prior to assembly of said retainer element on said annular flange portions.

5. The brake actuator defined in claim 1, wherein said generally annular flange portions of said housing and said cover each include a U-shaped portion in cross section opening outwardly having a diaphragm engagement portion engaging and compressed against said flats on said rim portion of said flexible diaphragm.

6. The brake actuator defined in claim 5, wherein said U-shaped portions of said housing and said cover each include an outer leg which receives and compresses therebetween said wedge-shaped edge portion of said flexible diaphragm.

7. The brake actuator defined in claim 6, wherein said annular clamp includes an annular U-shaped portion comprising an axial portion surrounding said flange portions of said housing and said cover and opposed axial portions overlying said flange portions of said housing and said over, said radial portions of said annular clamp compressing said rim portion of said flexible diaphragm to substantially fill said U-shaped portion of said clamp.

8. The brake actuator defined in claim 1, wherein said clamp is a separate element.

9. The brake actuator defined in claim 1, wherein said retainer element includes an annular clamp.

10. The brake actuator defined in claim 1, wherein said retaining element is integral with either said housing or cover flange portions.

11. A brake actuator including a housing having an open end and a generally radial annular flange portion surrounding said open end, a cover having a generally radial annular flange portion generally co-axially aligned with said generally radial annular flange portion of said housing, a cup-shaped flexible diaphragm having a central portion and an outer radial annular rim portion concentric around a central longitudinal axis, said outer radial annular rim portion located between said generally radial annular flange portions of said housing and said cover, and a generally U-shaped retainer element generally surrounding and compressing said generally radial annular flange portions of said housing and said cover against said rim portion of said flexible diaphragm, said radial annular rim portion of said diaphragm including a wedge-shaped edge portion having diverging surfaces and parallel radial flats having a width of at least 0.030 inches on opposite sides of said rim portion adjacent said diverging surfaces of said wedge-shaped edge portion extending perpendicular to said central longitudinal axis in its free state, said parallel radial flats aligning said flange portions of said housing and cover prior to assembly of said retainer element on said annular flange portions of said housing and cover and compressing said annular rim portion, said generally annular flange portions of said housing and said cover each including a U-shaped portion in cross-section opening outwardly having an engagement portion engaging and compressed against said parallel radial flats on said rim portion of said flexible diaphragm.

12. The brake actuator defined in claim 11, wherein said U-shaped portions of said housing and said cover each include an outer leg which receives and compresses therebetween said wedge-shaped edge portion of said flexible diaphragm.

13. The brake actuator defined in claim 12, wherein said annular clamp includes an annular U-shaped portion comprising an axial portion surrounding said flange portions of said housing and said cover and opposed axial portions overlying said flange portions of said housing and said cover, said radial portions of said annular clamp compressing said rim portion of said flexible diaphragm to substantially fill said U-shaped portion of said clamp.

14. The brake actuator defined in claim 11, wherein said clamp is a separate element.

15. The brake actuator defined in claim 11, wherein said retainer element includes an annular clamp.

* * * * *